United States Patent
Chen et al.

(10) Patent No.: US 8,868,106 B2
(45) Date of Patent: Oct. 21, 2014

(54) SYSTEM AND METHOD FOR LARGE-SCALE AND NEAR-REAL-TIME SEARCH OF MOBILE DEVICE LOCATIONS IN ARBITRARY GEOGRAPHICAL BOUNDARIES

(75) Inventors: Yixiang Chen, Palo Alto, CA (US); Drew S. Johnson, San Jose, CA (US)

(73) Assignee: Aeris Communications, Inc., Santa Clara, CA (US)

(*) Notice: Subject to any disclaimer, the term of this patent is extended or adjusted under 35 U.S.C. 154(b) by 417 days.

(21) Appl. No.: 13/408,748

(22) Filed: Feb. 29, 2012

(65) Prior Publication Data

US 2013/0225201 A1 Aug. 29, 2013

(51) Int. Cl.
*H04W 24/00* (2009.01)

(52) U.S. Cl.
USPC ............... 455/456.2; 455/410; 455/456.1; 455/411; 455/456.3

(58) Field of Classification Search
CPC ..... H04W 64/00; H04W 4/22; H04W 76/007; H04W 88/06; G01S 5/02; G01S 1/026; G01S 1/028; G01C 21/206; H04L 67/18
USPC ........ 455/450, 456.2, 410, 556.1, 411, 435.1, 455/551, 456.3
See application file for complete search history.

(56) References Cited

U.S. PATENT DOCUMENTS

| | | |
|---|---|---|
| 2004/0128314 A1 | 7/2004 | Katibah et al. |
| 2007/0276270 A1 | 11/2007 | Tran |
| 2008/0040384 A1 | 2/2008 | Kuznetsov |
| 2008/0042901 A1 | 2/2008 | Smith et al. |
| 2009/0227877 A1 | 9/2009 | Tran |
| 2011/0070863 A1 | 3/2011 | Ma et al. |
| 2011/0307325 A1 | 12/2011 | Hsiao et al. |
| 2012/0095357 A1 | 4/2012 | Tran |
| 2012/0242501 A1 | 9/2012 | Tran et al. |
| 2012/0330109 A1 | 12/2012 | Tran |
| 2013/0094369 A1 | 4/2013 | Nielsen et al. |

OTHER PUBLICATIONS

Orenstein, J. "Redundancy in Spatial Databases." ACM SIGMOD Record, vol. 18. No. 2. [online], Jun. 1989. [retrieved on Apr. 25, 2013]. Retrieved from the internet: <URL: http//www.cs.bu.edu/fac/gkollios/cs591/P294.PDF>.

International Search Report and Written Opinion for International Application No. PCT/US2013/027779, mailed May 28, 2013.

*Primary Examiner* — Joseph Arevalo
(74) *Attorney, Agent, or Firm* — Sawyer Law Group, P.C.

(57) ABSTRACT

A system and method for generating a one-dimensional spatial index and a temporal index in relation to one or more two-dimensional location points of one or more mobile devices to enable near-real-time searching of devices having fast-changing location information is provided for. The present invention may be used in a variety of implementations including being used in conjunction with searching for mobile devices within a geographical area for a time period; finding nearby devices within a time period; tracking device movement within a time period; determining clusters of devices for identification and location across different geographical regions at once.

16 Claims, 7 Drawing Sheets

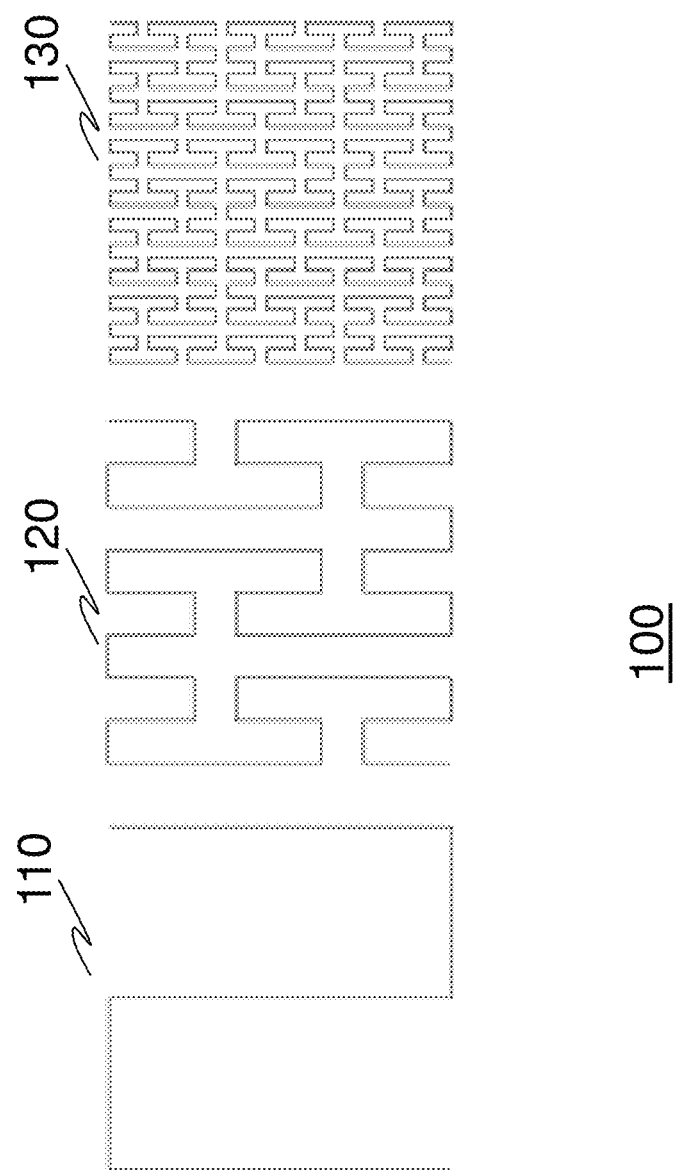

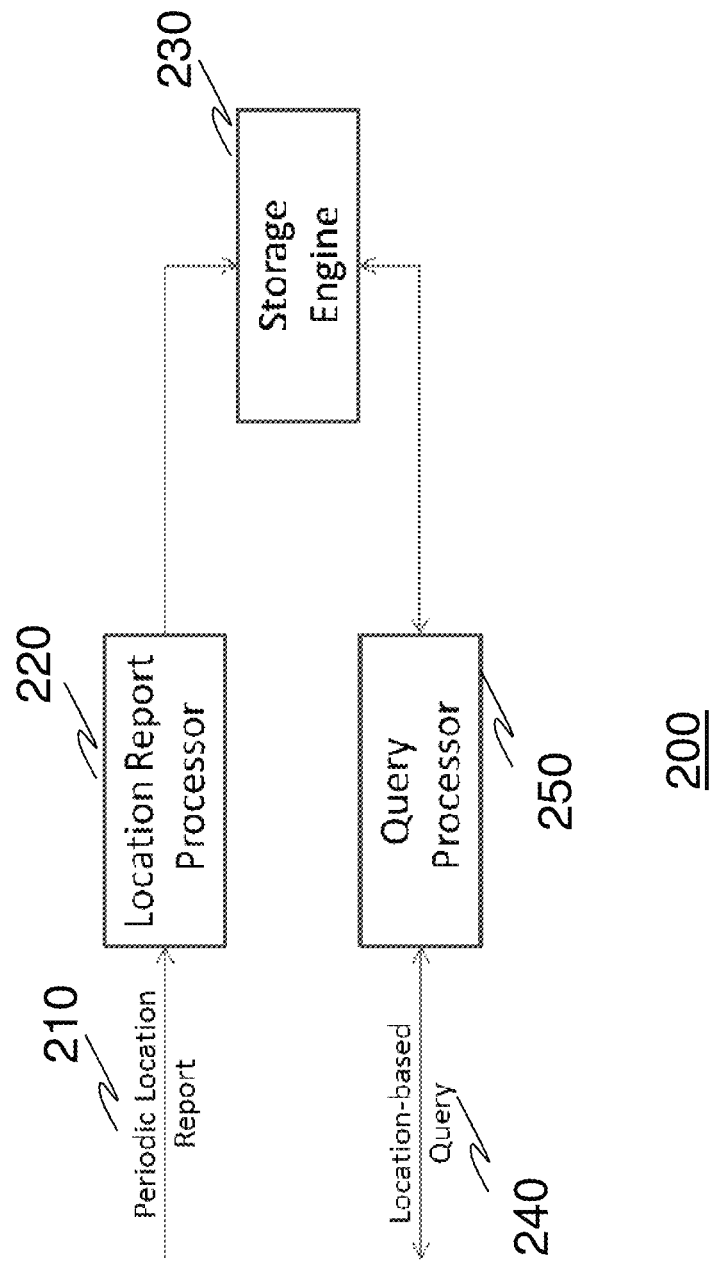

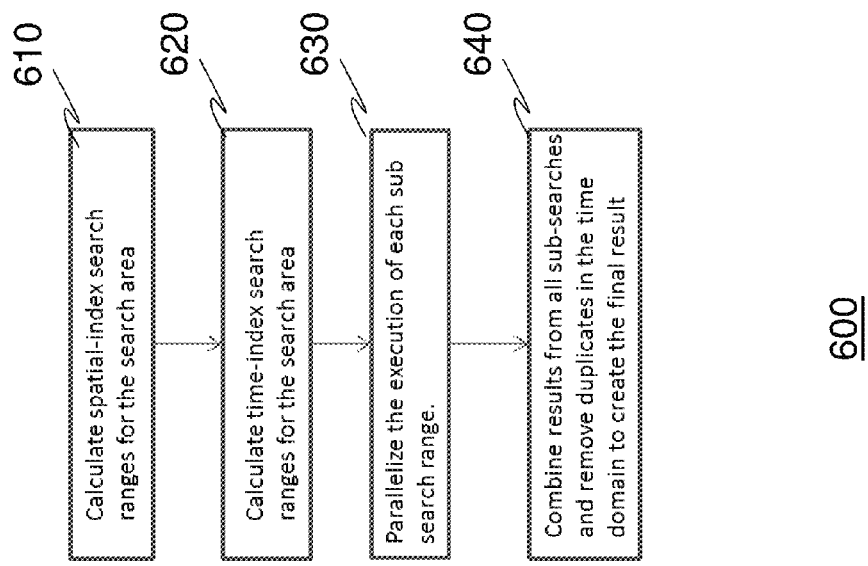

SYSTEM AND METHOD FOR LARGE-SCALE AND NEAR-REAL-TIME SEARCH OF MOBILE DEVICE LOCATIONS IN ARBITRARY GEOGRAPHICAL BOUNDARIES

FIELD OF THE INVENTION

The present invention relates generally to locating mobile devices and more particularly to efficient and scalable searching for such.

BACKGROUND

Being able to determine the physical location of a mobile device is important for ensuring consistent and accurate mobile communications. Over time, various techniques have been employed to identify, locate and "track and trace" devices in proximity to a communications tower, cellular Point of Presence (POP), etc. These techniques have often been refined in an attempt to improve the precision of detection of the device and also to assist in determining various linkage schemes to enhance cellular tower handoffs occurring when a device traverses across an area have a multitude of POPs.

Recently, the introduction of location awareness needs in and for devices has risen in the market primarily as a result of the demands from software applications (apps) which operate in conjunction with the mobile device (e.g., smartphone) require the location of the device to be known by the app for satisfactory operations. In order to operate effectively, the app must be made aware of the location of the device and be aware of how to accept location information having the same. Typically, an app designer coordinates the delivery of device location data to the app and many apps are designed to accept location information from a variety of sources. These designs typically rely on using Global Positioning System (GPS) Lookup and/or network-based positioning methods such as Cell Tower Lookup information, for example.

App designers also routinely engage several retrieval techniques to obtain device location information that may be resident or available as related to a device, often depending on its operating system (OS). For instance, for a Windows® mobile device, both Windows Mobile 5.0 and Windows Mobile 6 devices are known to contain an abstraction layer known as the GPS Intermediate Driver (GPSID) between the device driver that controls the GPS receiver and applications desirous of location or GPS information. In these situations, device location information is retrieved synchronously or asynchronously, including continued update availability for the latter situation, in direct relation to the location data obtained by the GPS radio. Similarly, mobile applications, such as Machine-to-Machine (M2M) apps, often require associated devices to report their respective location information to a central server or station periodically. In general, it is widely understood that app operations utilize and consume location information of devices at an ever-increasing rate.

However, in each of the above referenced scenarios, time is required to determine location information for each specific device and additional time is required where searches for devices in a geographical area (local, national, international) may be necessitated. In situations where there are tens of thousands of devices, for instance, the time required may be within the objectives of a communications system based on search interests; however, in situations where there may exist devices in quantities of factors greater than such, or where the search parameters are more arbitrary than specific, present techniques may prove inadequate for system objectives and performance needs.

For example, in a situation where there are millions of devices deployed across international locations ranging from metropolitan cities to remote continental locations, the ability to efficiently determine which devices are in a random geographical area at any specific time is inadequate using present methods as, in part, location information is both spatial and temporal.

To overcome this, attempts using present methods may employ a naïve linear scan (NLS) to examine location reports from every device as against a geographical search boundary. However, given the volume of devices, it is inconceivable that a NLS approach may operate efficiently, where a matching is required to be computed between a query and every location reporting the database, for instance, as the required search time likely linearly increases in relation to the number of devices of the inquiry. Further, where search boundaries of interest may be further complicated by non-predetermined, or randomized, geographical search interests, additional time and resources are further required. As a result, present methods and the NLS approach are generally impractical for most present and developing situations and more particularly, these approaches lack efficiencies in operation for situations of increasing devices having location information that is changing; similarly, these approaches are also inadequate as they often fail to take into consideration issues associated with time (i.e., temporally) in relation to effects of changing locations and associated information.

Accordingly, what is desired is to provide a system and method to locate mobile devices in arbitrary geographical boundaries in an efficient and scalable search methodology, preferably on a large-scale basis.

As used herein the terms device, third party system, smart phone, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

SUMMARY OF THE INVENTION

The present invention fulfills these needs and has been developed in response to the present state of the art, and in particular, in response to the problems and needs in the art that have not yet been fully solved by currently available technologies.

The present invention provide for a system, method and computer program product for searching for one or more mobile devices having location information in a searchable range within an arbitrary geographical boundary, comprising the steps of: generating a referential index pair in relation to one or more location points of the one or more mobile devices.

One embodiment of the present invention includes a system, method and computer program product for locating mobile devices having changing location information in arbitrary geographical boundaries by using an efficient and scalable search methodology including generating a one-dimensional spatial index and a temporal index in relation to location points of the devices.

In another embodiment, the present invention is a system, method and computer program product for generating a one-dimensional spatial index and a temporal index in relation to one or more two-dimensional location points of one or more mobile devices to enable near-real-time searching of devices having fast-changing location information.

Further embodiments, forms, objects, features, advantages, aspects, and benefits of the present application shall become apparent from the detailed description and drawings included herein.

BRIEF DESCRIPTION OF THE DRAWINGS

FIG. 1A illustrates three iterations of a Peano curve construction ranging from a first iteration, to a second iteration and to a third more detailed iteration.

FIG. 2 illustrates a system and method of the present invention in a preferred embodiment to generate index and support location-based searching.

FIG. 6 illustrates the processing steps of the Search Devices by Geographical Area.

DETAILED DESCRIPTION OF PREFERRED EMBODIMENTS

Figure 1B:
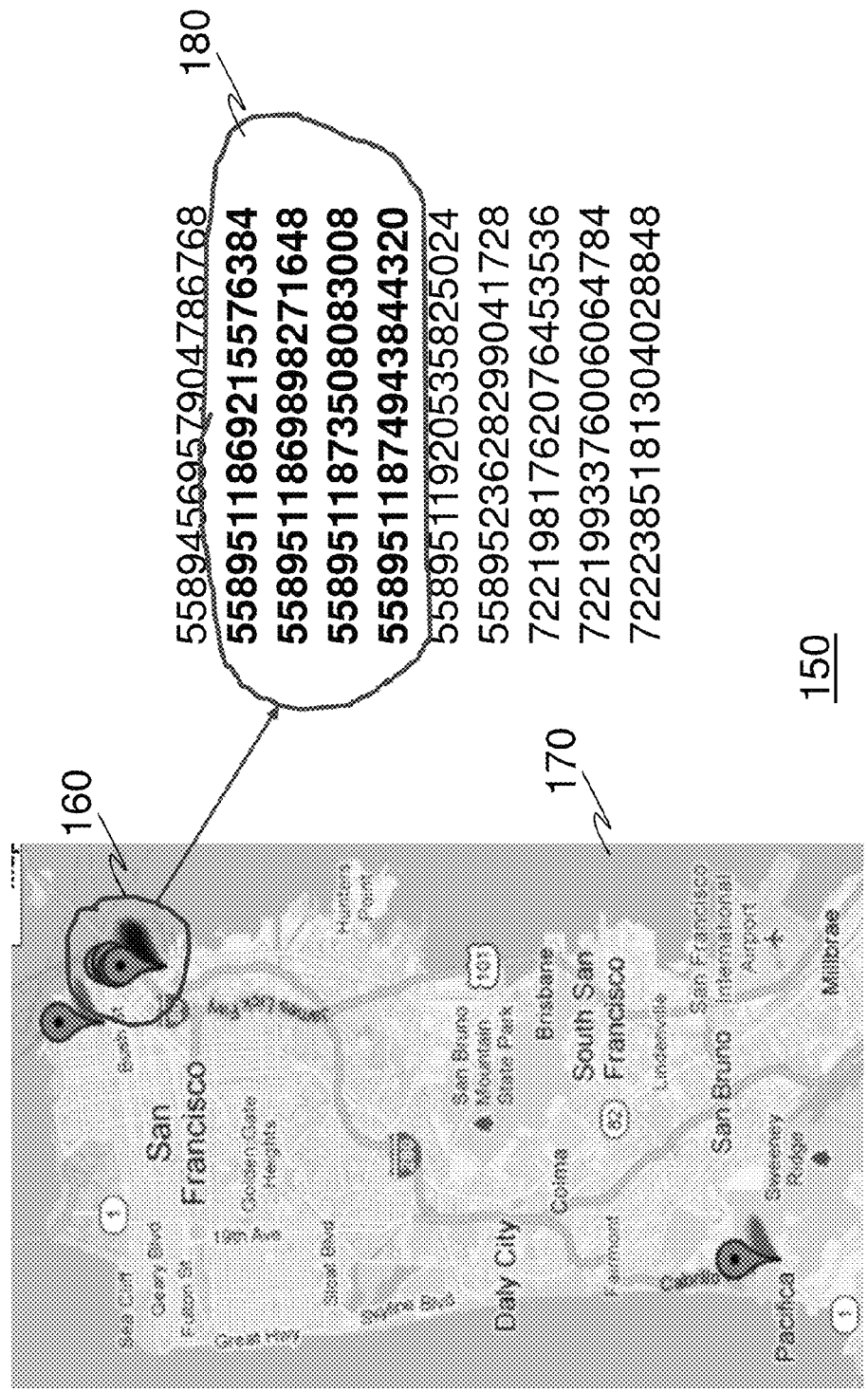
FIG. 1B illustrates an example of Z-order indexing in accordance with an embodiment of the present.

The present invention relates generally to locating mobile devices and more particularly to a system and method for efficient and scalable searching of mobile devices in arbitrary geographical boundaries. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides for a near-real-time searching system and method to locate one or more mobile devices in arbitrary geographical boundaries having changing location information by generating a one-dimensional spatial index and a temporal index in relation to one or more two-dimensional location points of the one or more devices. In a preferred embodiment of the present invention, a system and method for generating a one-dimensional spatial index and a temporal index in relation to one or more two-dimensional location points of one or more mobile devices in a scalable manner to enable efficient near-real-time searching of devices having changing location information is provided for.

It will be understood by those skilled in the art that one or more methods of the present invention may be employed and that the presence or absence of a particular aspect presented herein is not indicative of any limitation to the present invention.

The typical coordinate point locations on a geographically-oriented map are typically defined in a coordinate system such as that like the World Geodetic System 1984 WGS 84; WGS 84 was last revised in 2004). On a two-dimensional map, a point location using WGS 84 is represented by its longitude and latitude. The WGS 84 is currently the reference system that is being used by GPS and is geocentric and globally consistent within ±1 meters.

For the present invention, point indices are determined in relation to a traditional coordinate map identification means (referred to as "location points") by generating a one-dimensional associated index. By way of example, for the present invention, a traditional map space is further segmented into smaller portions of near equal size (i.e., grid-like) to essentially partition the map space into a more detailed grid arrangement. Similar to the WGS 84 approach, coordinates under the WGS 84 can be identified by indexing in relation to the grid arrangement. Point indices may be determined using a mathematical construct, such as a Peano Curve (also used as Z-order curve or Z-curve), whose limit is a space-filling curve. FIG. 1A illustrates three iterations of a Peano curve construction (100) ranging from a first iteration (110), to a second iteration (120) and to a third more detailed iteration (130). The Peano Curve is but one mathematical method or "curve-construct" method for the present invention and it will be appreciated by those of skill in the art that other variants, known and developed hereafter, which are also incorporated herein. Mathematical methods and curve-construct methods provide for spatial indexing approaches and preferably one-dimensional spatial indexing approaches for the present invention.

Another example of a mathematical method includes Z-ordering in which locations that are close in proximity are also close in their Z-values as determined from a Z-order methodology (i.e. Morton Code) where latitude and longitude are encoded via bit leaving, for instance. Z-ordering is a further example of a method which may be used with the present invention providing a hierarchical spatial data structure which subdivides space into smaller aspects of grid shape. For instance, in using Z-ordering, nearby places will often but not necessarily present similar prefixes or Z-values (i.e., the longer a shared prefix is, the closer the two places are) which may be well-suited for sorting and further data investigation under the present invention. FIG. 1B illustrates an example of Z-order indexing (150) in accordance with an embodiment of the present invention in which four nearby locations (160) having close map coordinates when mapped on a map (170) which translate to Z-order indexes having similar prefixes (180) due to their physical proximities to one another. The prefixes produced indexes having similar prefixes (180) provide for a one-dimensional spatial index which is conveniently sortable and suited for range searching (i.e., proximity searching in two-dimensions).

In a preferred embodiment of the present invention, one exemplary implementation of defining a Peano Curve is to calculate the Z-value of a point location by interleaving the bits in the binary representation of its longitude and latitude; in operation for a preferred embodiment of the present invention, the Peano Curve has the bit shuffling property including a means interleaving the bits from two coordinates of a defined point in base 2 in the two-dimensional space. In calculating the Z-value, it will become apparent to those skilled in the art that the Z-value calculation preserves spatial proximity such that mapped coordinate points which are proximate to one another will also have similar calculated Z-values under the present invention. The present invention then effectively utilizes the space-filling curve property approach via a mathematical method to efficiently effect a geographical search on a two-dimensional map into a range search on a sorted (or sortable) one-dimensional spatial index.

In a preferred embodiment of the present invention, as location data is understood by those skilled in the art as being temporal, a further index ("time index") is added in relation to time. Under the present invention, a time index is added along a time dimension to facilitate search efforts in the time-space continuum ("time space"). To develop the associative relationship between time and location using the present invention, time is preferably segmented into continuous time slots (e.g. in 1-minute increments). Once the time is segmented, a build location index (also used herein as temporal index) is determined for each time slot by the present invention.

In another embodiment, the present invention is a system and method for generating a one-dimensional spatial index and a temporal index in relation to one or more two-dimensional location points of one or more mobile devices to enable near-real-time searching of devices having fast-changing location information.

In a further embodiment, the present invention identifies a basis of search query, such as a geographical basis, and segments the geographical search query into a plurality of sub-queries arrangements to enable concurrent searching for improved efficiencies. In a further preferred embodiment of the present invention, the results of the plurality of sub-queries are compared for duplicates. The duplicates are pared from the results of the plurality of sub-queries to generate a final response for searching.

FIG. 2 illustrates a system and method (200) of the present invention in a preferred embodiment to generate index and support location-based searching. As set forth in FIG. 2, in a preferred embodiment, a period location report (210) is provided to a Location Report Processor (220) which processes the report and determines a temporal index. The temporal index determined from the Location Report processor is provided to a Storage Engine (230) or storage device. A location-based query (i.e., geographic) at 240 is provided to a Query Processor (250) which processes the report and determines a spatial index which is provided to the Storage Engine (230) or storage device. A system and method in accordance with the present invention performs Device Location Indexing via the Location Report Processor and Search of Devices by Geographical Area via the Query Processor.

Figure 3:
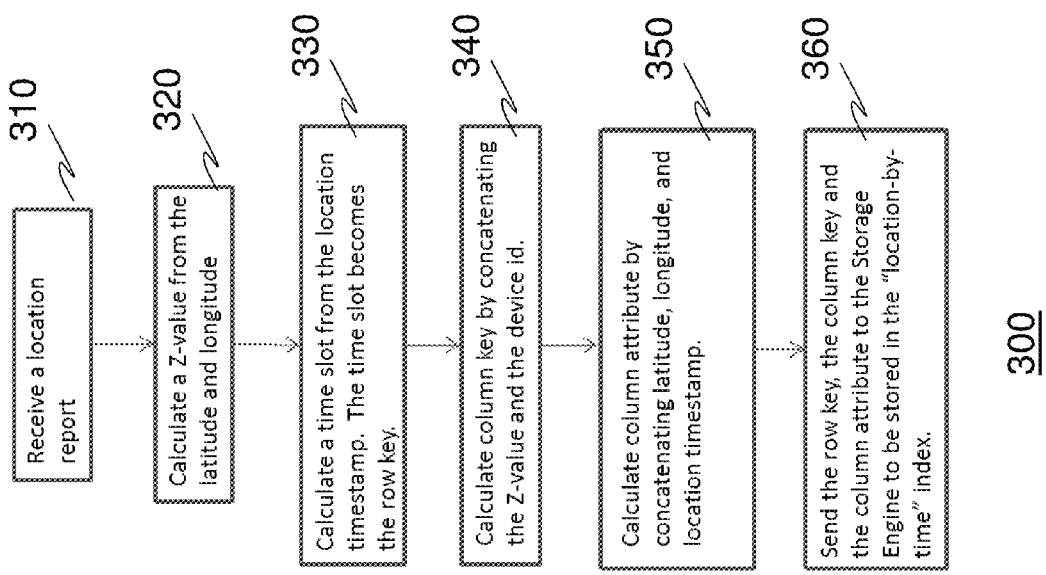
FIG. 3 illustrates the processing steps of the Location Report Processor referenced in FIG. 2.

FIG. 3 illustrates the processing steps of the Location Report Processor (300) of FIG. 2. The Location Report Processor builds the "location-by-time" index of the present invention (i.e., temporal index, time index) presenting an index structure that is similar to a key-value map data structure. The location-by-time index provides for two types of keys: row key and column key. Each row key uniquely identifies a collection of column keys. Each column key uniquely identifies a column attribute. In the "location-by-time" index, row keys are analogous to time slots such as a 1-minute interval. The column key is a concatenation of the Z-value of a point location and the device identifier and may be represented by a Z-value of latitude/longitude and the device identifier. The column attribute ("column value") is a composite value consisting of latitude, longitude, speed, heading and location timestamp in relation to the device. Similarly, from the description of FIG. 3, the location-by-time index may be presented as in Table 1 below:

TABLE 1

| Row Key: Time slot (e.g. in 1 minute increment) | Column Key: <Z-value, device-id> Column Value: <latitude, longitude, uncertainty, altitude, speed, location timestamp> |

In an embodiment, the time slot may be tuned depending on the specific application. In operation, to calculate the time slot in 1-minute increments under the present invention, it will be understood that a location timestamp (expressed in microseconds since Unix Epoch) may be divided by 60,000,000. It will be further appreciated by those skilled in the art that the present invention is not so restricted to only using the Z-value, as the Z-value is but one example of calculating an index value from a 2-dimensional value for the present invention. The present invention is not limited to 2-dimenstional values or calculations, rather the present invention may also incorporate "Altitude" for example within an index calculation such that an index can be built for 3-dimensional values.

From FIG. 3, the processing steps include: receiving a location report at 310 in relation to the device of interest; calculating a z-value from the latitude and longitude at 320; calculating a time slot from the location timestamp, where the time slot becomes the row key at 330; calculating the column key by concatenating the Z-value and the device identification at 340; calculating the column attribute by concatenating longitude, latitude, and location timestamp at 350; and, sending the row key, column key and the column attribute to the Storage Engine to be stored in the "location-by-time" index at 360.

The Query Processor decomposes a geographical area-based query into parallel sub-queries and combining results from sub-queries into one response. The Query Processor decomposes the geographical area into n number of smaller bounding boxes covering the area and calculate a Z-value for each bounding box. The processor then calculates a search range from each Z-value. The search range contains all integer values that have the same most-significant no-zero digits from the bounding-box Z-value. For example, if the binary representation of a bounding-box Z-value is 01101000, then the search range is between 01101000 and 01101111. The Query Processor will calculate n number of search ranges from the n number of bounding boxes. Each search can then be carried out in parallel or concurrent manner under the present invention.

Figure 4:
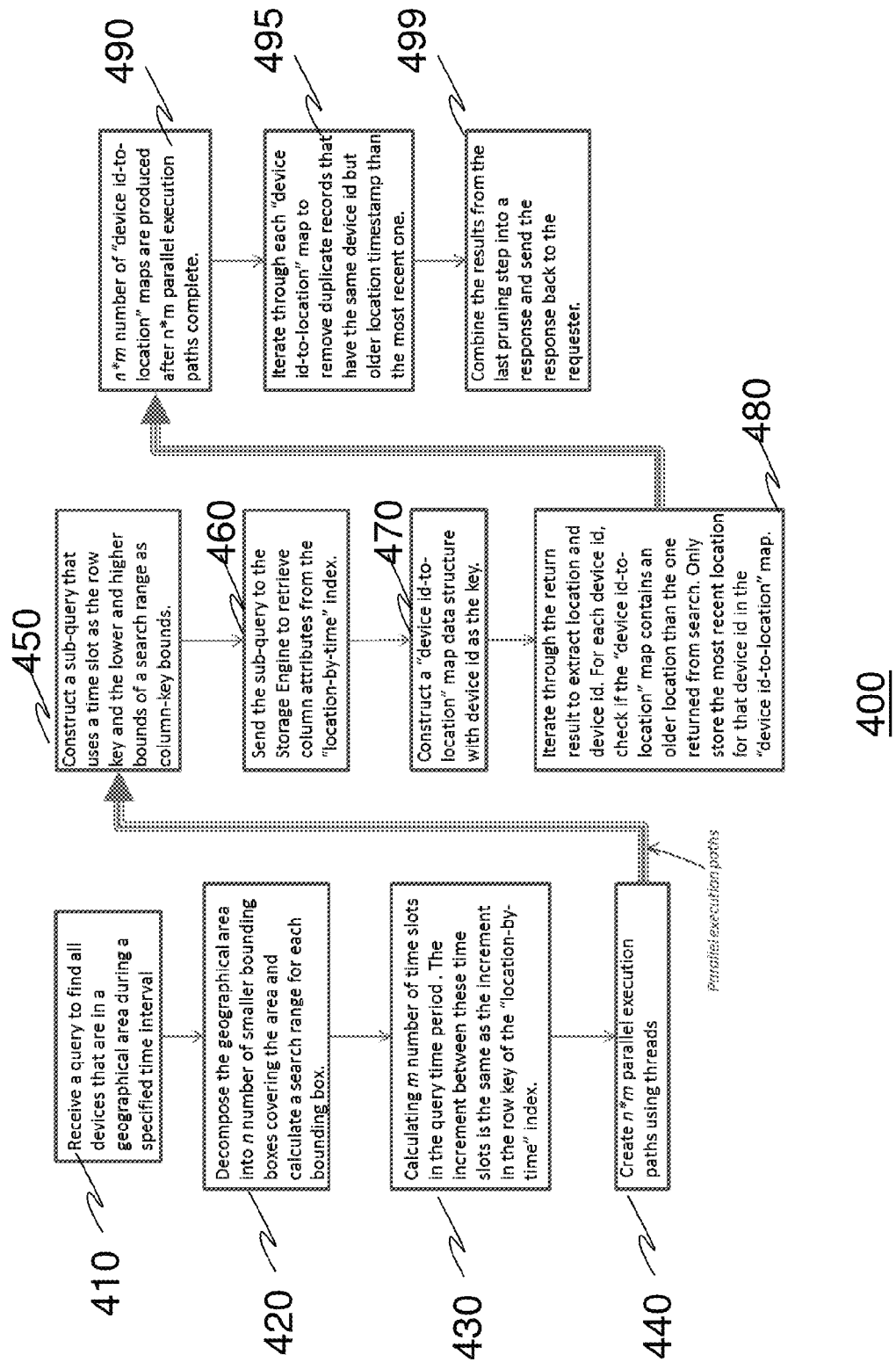
FIG. 4 illustrates the processing steps of the Query Processor of FIG. 2.

FIG. 4 illustrates the processing steps of the Query processor of FIG. 2. The processing steps include:

The processing steps consist of the following: receiving a query to final devices in the geographical area during a specific time interval at 410; decomposing the geographical area into a number of smaller bounding boxes and calculating a search range for each bounding box at 420; calculating the number of time slots in the query time period at 430; creating parallel, or concurrent, execution paths using threads at 440; and concurrently executing steps of: constructing a sub-query using a time slot as the row key and the lower and higher bounds of a search range as column-ley bounds at 450; sending the sub-query to the Storage Engine to retrieve column attributes from the "location-by-time" index at 460; constructing a device identification to location map data structure with the device identification as the key at 470; iterating through the return result to extract location and device identification at 480; producing a number of device identification to location maps after parallel execution paths complete at 490; removing duplicate records at 495; and, combining the results into a return response at 499.

The Storage Engine creates a storage area on a storage device to hold content of the index. In a preferred embodiment, the Storage Engine stores column keys in the sorted order on a storage device such as a hard disk. Preferably, the Storage Engine further translates row key and column key based lookups into appropriate storage device operations such as disk seek.

Figure 5:
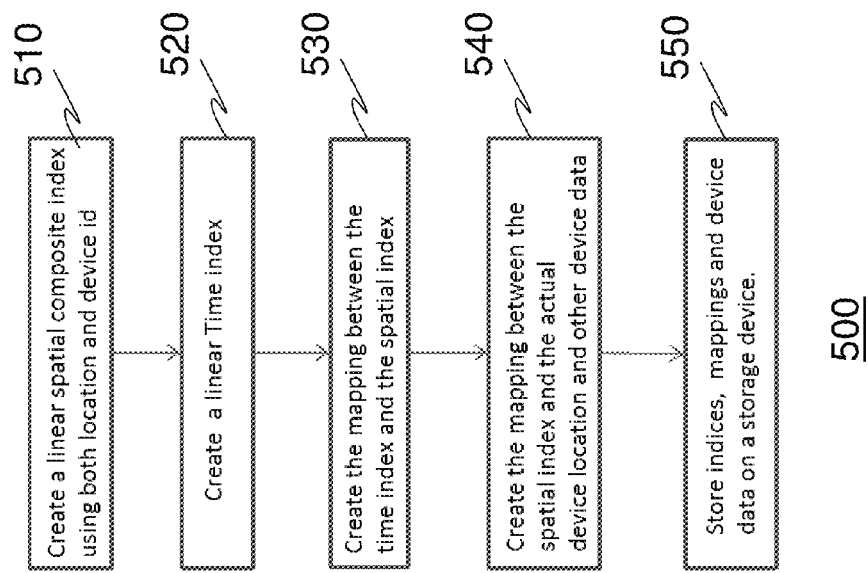
FIG. 5 illustrates processing steps of the Device Location Indexing.

FIG. 5 illustrates processing steps of the Device Location Indexing (500). From FIG. 5, the processing steps include:

creating a linear spatial composite index using both location and device identification at 510; creating a linear time index at 520; creating a mapping between the time index and the partial index at 530; creating the mapping between the spatial index and the actual device location and other device data at 540; and storing indices, mappings and device data on a storage device at 550.

FIG. 6 illustrates the processing steps of the Search Devices by Geographical Area (600). From FIG. 6, the processing steps include: calculating spatial-index search ranges for the search area of interests at 610; calculating time-index search ranges for the search area of interest at 620; parallelizing, or concurrently processing the execution of each sub search range identified at 630; and, combining the results from each of the sub-searches and removing the duplicates in the time domain to generate a final result for a main search at 640.

The present system and method may be applied to a variety of applications including a large array of location-based services such as but not limited to: searching for mobile devices within a geographical area for a time period; finding nearby devices within a time period; tracking device movement within a time period; determining clusters of devices for identification and location across different geographical regions at once. Further, in various preferred embodiments, the present invention may be implemented to support network operations, device monitoring, mobile advertising, eHealth and many other commercial applications.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Many other embodiments of the present invention are also envisioned. For example, in other embodiments, the present invention is directly applicable for kits and improvement configurations to existing USB devices.

As used herein, terms such as personal computers, PCs, systems, servers, processor, computer, computing means, stations, and similar terms are intended to be used interchangeably, without distinction or limitation. Such systems may include but not be limited to servers, server-based systems, multi-chipset systems, touch sensitive systems, assemblies and devices therein, etc.

As used herein, the terms "remote", "peripheral", "device", and the like are intended to be used interchangeably but are not intended to be singular or necessarily specific to a particular connection technology such as being hardwired or wireless, but rather such terms are used with the understanding that the terms of interest are in or capable of being in operative communication with a system of the present invention.

As used herein, the terms "location-by-time" index, temporal index, time index and similar are intended to be used interchangeably. As used herein, the terms geographical index, spatial index, distance index and similar are intended to be used interchangeably.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:

1. A method for searching for one or more mobile devices having location information in a searchable range within an arbitrary geographical boundary, the method comprising:
   generating a referential index pair in relation to one or more location points of the one or more mobile devices, wherein generating further includes generating a one-dimensional spatial index and generating a temporal index, where generating a temporal index is performed using a location report processor which determines a location-by-time index value in relation to location information of the one or more mobile devices, wherein the location report processor executes:
   receiving a location report having location information of the one or more devices;
   calculating a z-value from a latitude and longitude of the received location information for at least one of the one or more mobile devices; and
   calculating a time slot from a location timestamp associated with at least one of the one or more mobile devices.

2. The method of claim 1, wherein the calculated time slot is determined to be a value for a row key and each of the one or more mobile devices has device identification.

3. The method of claim 2 wherein the location report processor further executes:
   calculating a column key by concatrnating the calculated z-valued and the device identification; and
   calculating a column attribute by concatenating longitude, latitude, and location timestamp.

4. The method of claim 3, wherein the step of concatenating the calculated z-value and the device identification results in a Z-order index value.

5. The method of claim 3, wherein the location report processor further executes:
   transmitting the row key, column key and the column attribute as the temporal index to a storage device.

6. The method of claim 5, wherein the step of generating a one-dimensional spatial index is performed using a query processor which determines a spatial index value in relation to location information of the one or more devices.

7. The method of claim 6, wherein the query processor executes:
   receiving a query to devices in a geographical area during a specific time interval;
   decomposing the geographical area into a plurality of bounding boxes and calculating a search range for each bounding box in the plurality;
   calculating a plurality of time slots in the time interval; and
   concurrently executing the steps of:
      constructing a sub-query using a time slot of the plurality as a row key value and a lower and higher bounds of a search range as a column-key bounds value;
      transmitting the sub-query to a storage device to retrieve one or more column attributes from the temporal index;
      constructing a device identification to location map data structure with device identification as a key;
      iterating through a returned result from the storage device to extract location and device identification; and
      generating a number of device identification to location map results after completion of the concurrent execution steps; and generating a main search result.

8. The method of claim 7, wherein the storage device is a storage engine.

9. The method of claim 8, wherein the storage engine stores column keys in a sorted order on a data storage device.

10. The method of claim 9, wherein the storage engine further translates row key and column key based lookups into one or more predetermined storage device operations.

11. A system for performing near-real-time searching to locate one or more mobile devices in arbitrary geographical boundaries having location information, comprising:
a query generator for constructing and executing parallel search segments;
a location report generator for generating a time index and a one dimensional spatial index; and
a storage engine for performing key translations, each in relation to one or more two-dimensional location points of the one or more mobile devices;
wherein the location report generator receives a location report having location information of the one or more mobile devices; calculates a z-value from a latitude and longitude of the received location information for at least one of the one or more mobile devices; calculates a column attribute by concatenating longitude, latitude, and location timestamp of the one or more mobile devices; generates a time index to the storage engine; and
wherein the query generator receives a query to the one or more mobile devices in a geographical area during a specific time interval; calculates a plurality of time slots in the time interval; transmits sub-query to the storage engine to retrieve one or more column attributes from the time index; generates a number of devices identification to location map results; and generates a main search result.

12. The system of claim 11, wherein the location information of the one or more mobile devices is fast-changing.

13. A system for searching for a plurality of mobile devices having location information in a searchable range within an arbitrary geographical boundary, comprising:
a query generator for generating a one-dimensional spatial index, wherein the query generator determines a spatial index value in relation to location information and a location report generator for generating a time index which determines a location-by-time index value in relation to location information of the one or more mobile devices, wherein the location report generator is a processor executing:
receiving a location report having location information of the one or more devices;
calculating a z-value from a latitude and longitude of the received location information for at least one of the one or more devices;
calculating a time slot from a location timestamp associated with at least one of the one or more devices;
calculating a column key by concatenating the calculated z-value and the device identification;
calculating a column attribute by concatenating longitude, latitude, and location timestamp; and
sending the row key, column key and the column attribute as the time index to a storage device.

14. The system of claim 13, wherein the query generator is a processor executing:
receiving a query to devices in a geographical area during a specific time interval;
decomposing the geographical area into a plurality of bounding boxes and calculating a search range for each bounding box in the plurality;
calculating a plurality of time slots in the time interval; and
concurrently executing the steps of:
constructing a sub-query using a time slot of the plurality as a row key value and a lower and higher bounds of a search range as a column-key bounds value;
transmitting the sub-query to the storage device to retrieve one or more column attributes from the time index;
constructing a device identification to location map data structure with device identification as a key;
iterating through a returned result from the storage device to extract location and device identification;
generating a number of device identification to location map results after completion of the concurrent execution steps; and
generating a main search result.

15. A computer program product stored on a computer usable medium, comprising:
computer readable program means for causing a computer to perform near-real-time searching to locate one or more mobile devices in arbitrary geographical boundaries having changing location information by generating a one-dimensional spatial index using a query processor;
a temporal index using a location report processor, wherein the location report processor executes:
receiving a location report having location information of the one or more devices;
calculating a z-value from a latitude and longitude of the received location information for at least one of the one or more devices;
calculating a time slot from a location timestamp associated with at least one of the one or more devices;
calculating a column key by concatenating the calculated z-value and the device identification;
calculating a column attribute by concatenating longitude, latitude, and location timestamp; and
sending the row key, column key and the column attribute as the time index to a storage device; and
a storage engine performing key translations, each in relation to one or more two-dimensional location points of the one or more mobile devices.

16. The product of claim 15, wherein
the query processor executes:
receiving a query to devices in a geographical area during a specific time interval;
decomposing the geographical area into a plurality of bounding boxes and calculating a search range for each bounding box in the plurality;
calculating a plurality of time slots in the time interval;
concurrently executing the steps of:
constructing a sub-query using a time slot of the plurality as a row key value and a lower and higher bounds of a search range as a column-key bounds value;
transmitting the sub-query to the storage engine to retrieve one or more column attributes from the time index;
constructing a device identification to location map data structure with device identification as a key;
iterating through a returned result from the storage device to extract location and device identification;
generating a number of device identification to location map results after completion of the concurrent execution steps; and
generating a main search result; and
the storage engine stores column keys in a sorted order on a data storage device and further translates row key and column key based lookups into one or more predetermined storage device operations.

* * * * *